Jan. 22, 1946. T. G. SOMA 2,393,572
SCREW CONVEYER
Filed June 3, 1944
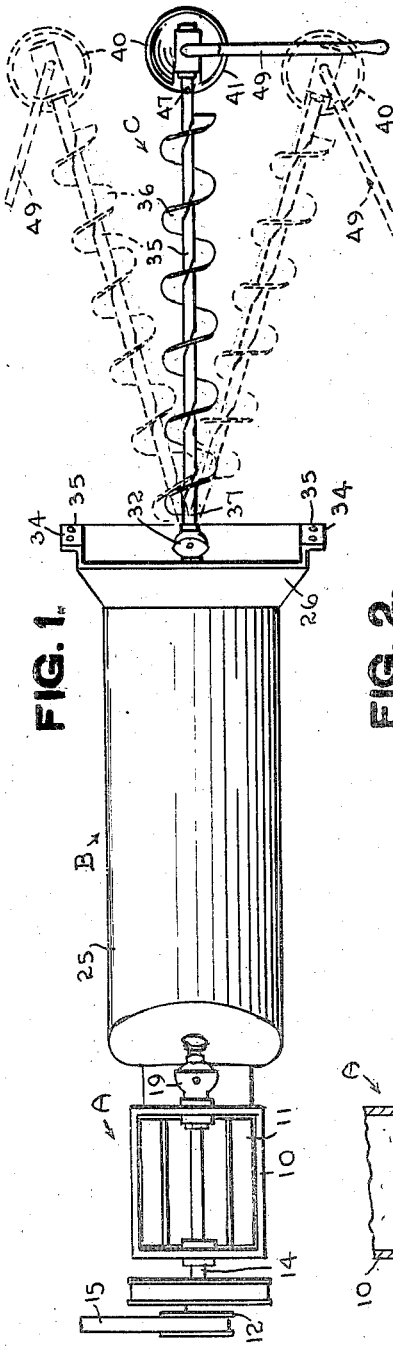
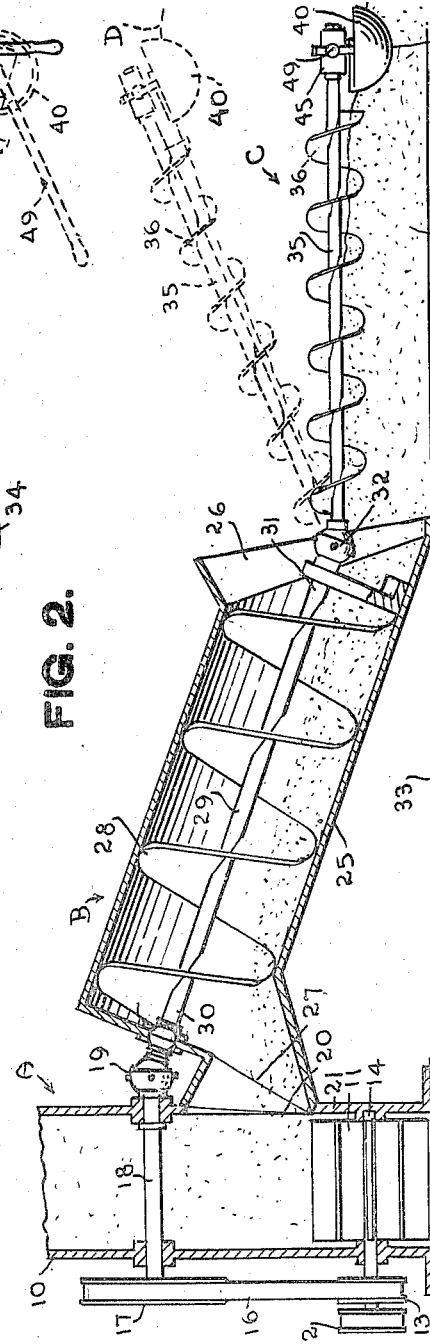
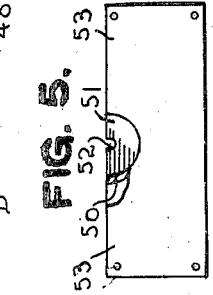
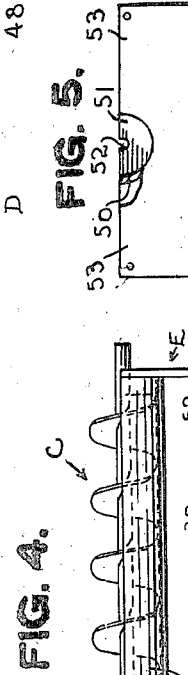
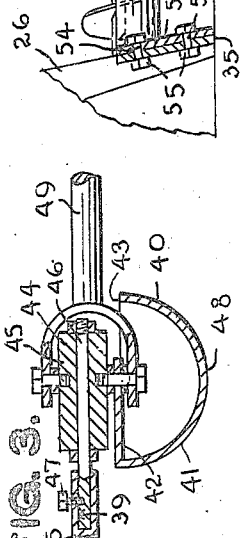
INVENTOR.
Torger G. Soma
BY
ATTORNEYS.

Patented Jan. 22, 1946

2,393,572

UNITED STATES PATENT OFFICE 2,393,572

SCREW CONVEYER

Torger G. Soma, Cooperstown, N. Dak.

Application June 3, 1944, Serial No. 538,646

4 Claims. (Cl. 198—213)

This invention relates to power-driven screw conveyers and more particularly to such a conveyer adapted to remove grain and the like from one location to another location.

An important object is to provide a novel screw conveyer for grain and the like adapted to remove the material from piles, irrespective of the height, length or breadth of the piles and despite irregularities in the contours of the piles.

Another important object is to provide a conveyer which is adapted to move grain and the like from a discharge point to another point, such as from the discharge point of grain unloaded from grain slides in the floors of trucks, to bins, other conveyers and the like.

One embodiment of the invention contemplates an unsheathed conveyer, that is, one without a housing, and still another object is to provide a novel means for moving the free end of the conveyer in various arcs so that the longitudinal axis of the screw will be inclined, either from the vertical or the horizontal.

Another object is to provide a means for raising the free end of the screw from the supporting surface, such as the surface of the grain pile or the ground. This is for at least three reasons: first, some grains in piles will not readily separate to allow a free end of the screw to sink into the piles, second, continued rotation of the metallic free end of a screw conveyer in substantially the same place, in a pile of dusty grain or the like produces considerable friction and consequent heat, and, third, the free end and, in fact, the entire screw, from the free end to the fixed end of this novel screw conveyer, is disposed above the ground, even when the screw sinks to the bottom of the pile, so that ground dirt and soil are not conveyed by the screw and mixed with the conveyed grain.

Other objects and advantages of this invention will be apparent during the course of the following detailed description of the invention, taken in connection with the accompanying drawing, forming a part of this specification, and in which drawing:

Fig. 1 is a top plan of the novel conveyer employed in connection with a blower.

Fig. 2 is a vertical longitudinal section thereof.

Fig. 3 is an enlarged fragmentary longitudinal section of the free end of the conveyer.

Fig. 4 is a side elevation of a trough-like housing for use with the conveyer.

Fig. 5 is an end view, with a fragment in transverse section of the housing of Fig. 4.

In the drawing, wherein for the purpose of illustration is shown a preferred embodiment of the invention and wherein similar reference characters designate corresponding parts throughout the several views, the letter A may designate means for elevating grain and the like, the letter B, a screw conveyer of conventional construction, C, the novel screw conveyer, D material such as grain, and E a trough-like housing for the conveyer C.

The means A for elevating the grain and the like may include a substantially vertical housing 10, having a fan 11, shown by way of example, for creating a current of air to blow upwardly material, as grain, discharged into the housing, a pair of pulleys or belt wheels 12 and 13 mounted on the horizontal shaft 14 of the fan 11, one wheel 12 having a belt 15 extending to a source of rotative power (not shown) and the other wheel 13 carrying a belt 16 extending upwardly to a belt wheel 17 mounted upon a horizontal shaft 18 extending through the housing 10, and having a universal joint 19 at its end opposite said wheel 17. The housing 10 has a mouth or opening 20 in one wall 21 above the fan 11. While the fan 11 is shown, by way of example, any elevating means for material, such as grain may be employed.

The screw conveyer B is provided with the conventional cylindrical housing 25, open at its receiving end 26 and discharge end 27, has a conventional rotor, as the screw 28 and shaft 29. The latter may be coupled, at its end 30 to the universal joint 19, supported by the housing 25 at this end by suitable bearings, and provided at its opposite end 31 with a universal joint 32. The conveyer B is adapted to extend from a supporting surface 33, such as the ground or a floor, upwardly at a suitable angle, such as 25°, to the mouth 20 of the elevating means A. At the receiving end 26 the walls of the housing 25 may flare outwardly and then terminate in wings 34 at opposite sides of the housing. These function, in part, to provide a flat surface 35 contacting the supporting surface 33.

Now, as to the novel screw conveyer C, this includes an elongated screw conveyer shaft 35, with a screw 36 of conventional spiral formation thereon, the turns thereof all having, preferably, a like diameter and radius. The screw 36 ends short of the ends of the shaft 35, and while one end 37 (the inner end) is adapted to be coupled to the shaft 29 at the universal joint 32, the opposite (or outer) end is provided with a socket 39 extending longitudinally of the shaft 35. The universal joint 32 permits the shaft 35 to be swung into horizontal arcs or tilted upwardly.

Means 40 to retain the screw 36 from or above the supporting surface 33, comprises a support which includes a hemispherical or cup-shaped member 41 with a horizontally disposed arm 42 extending from its rim 43 and carrying a bearing 44 which may comprise a block 45 of suitable material, having a horizontal bore accommodating a short shaft 46 for rotation therein and extending outwardly for coupling to the shaft at the socket 39 where the two shafts may be secured togther with the screw 47. The shortest distance between the axis of rotation of the shaft 46 and the outer surface 48 of the bottom wall of the member 41 is greater than the radius of the turns of the screw 36, whereby the screw 36 will not contact the supporting surface 33 when the novel screw conveyer C is disposed horizontally nor inclined from the horizontal, as may be seen from Fig. 2.

Carried by the means 40 is a handle 49. This handle is pivoted to the block 45 in any approved way so that the handle may be swung into various positions, such as, for example, as shown in full and dotted lines in Fig. 1. This pivotal connection permits an operator, when he swings the conveyer C, on the universal joint 32, into various positions, to employ the handle 49 at best advantage, since the operator must sometimes work in cramped quarters, where it might not be possible to manipulate a fixed handle.

In the event it is desired to convey grain from a pile to the elevator A, after the sheathed conveyer B is placed in position with respect to A and properly coupled, the novel conveyer C is coupled to B and disposed upon the pile of grain D. The conveyer C may now be rocked, upon the hemispherical member 41 by employing the handle 49, so that it will sink slightly into the grain and the lower portions of the turns or spirals of the screw 36 will also sink into the grain. Upon starting the power, the screw conveyer C will convey the grain to the conveyer B which will receive and elevate it to the elevator A.

There will be a slight rocking of the support means 40 when the power is on and this aids in keeping the conveyer C buried in the grain sufficiently to cause efficient operation of the conveyer C.

Of course, the operator, when one portion of the grain pile is lowered, may move the conveyer C as described in order to work on another portion of the pile.

Sometimes it is desirable not to allow a pile of grain to accumulate before being operated upon by the conveyer C as heretofore described. In such an event, the trough-like housing E may be employed with the screw conveyer C. This housing E has an arcuate wall 50 which encloses substantially only the lower half of the conveyer C, although this enclosure may vary. The important and essential feature of the housing is that it is upwardly open, longitudinally thereof. There is provided one end wall 51 for the housing 50 and this has a suitable opening, which is, preferably, a slot 52 accommodating the said outer end of the shaft 35 for rotation therein.

There is no opposite end wall, but extending outwardly from the wall 50, at opposite sides thereof are a pair of wings. These wings 53 and the wings 34 of the housing 25 may be coupled together by any suitable means, as by bolts 54, extending through aligning perforations in the wings 34 and 53, and having nuts 55.

Grain may be dumped or shovelled into the housing 50 and will be conveyed by the conveyer C to the conveyer B.

Various changes may be made to the form of the invention herein shown and described without departing from the spirit of the invention or scope of the claims.

I claim:

1. In a houseless power-driven screw conveyer for grain in piles, a screw conveyer shaft, a screw thereon adapted to contact the grain, universal joint, means at one end of said shaft to attach a rotor thereto, and rocking means at the other end of said shaft to retain said screw spaced from the supporting surface of said pile, including a cup-shaped member having an outer lowermost convex face and a bearing above said member.

2. In a sheathless power-driven screw conveyer for grain in piles, a conveyer shaft, a spiral conveyer element extending along said shaft short of the ends thereof, said shaft having a longitudinally-extending opening in one end, means at the other end to couple a rotor thereto, a support including a base and a bearing supported by said base having a rotatable shaft extending into said opening and secured to the conveyer, the shortest distance from the bottom face of said support to the axis of rotation of said shaft being greater than the greatest radius of said spiral conveyer element, and a handle pivotally secured to said bearing, with its pivoted axis substantially normal to the axis of rotation of said shaft.

3. In a houseless power-driven screw conveyer for grain in piles, a screw conveyer shaft, a screw thereon, adapted to contact the grain, means at one end of said shaft to attach a rotor thereto, and means at the other end of said shaft to retain said screw spaced from the supporting surface of said pile, including a substantially hemispherical member adapted to contact said pile, whereby when said shaft and screw are rotated said member will rock slightly and descend into said grain in piles.

4. In a houseless power-driven screw conveyer for grain in piles, a screw conveyer shaft, a screw thereon adapted to contact the grain, universal joint means at one end of said shaft to attach a rotor thereto, and means at the other end of said shaft to retain said screw spaced from the supporting surface of said pile, comprising a cup-shaped support having a concave lower face adapted to engage said grain in piles, a substantially horizontal arm extending from the upper edge of said cup-shaped support and a bearing for said shaft pivotally carried by said arm, with the shortest distance from the center of said bearing to the bottom surface of said support greater than the radius of said screw.

TORGER G. SOMA.